United States Patent Office 3,355,504
Patented Nov. 28, 1967

3,355,504
PREPARATION OF 2,6-DIALKYL PHENOLS
Thomas H. Coffield, Farmington, and Gordon G. Knapp and John P. Napolitano, Royal Oak, Mich., assignors to Ethyl Corporation, New York, N.Y., a corporation of Virginia
No Drawing. Filed Nov. 5, 1963, Ser. No. 321,396
16 Claims. (Cl. 260—624)

This invention relates to an improved process for preparing 2,6-dialkyl phenols. More particularly, this invention relates to the preparation of 2,6-dialkyl phenols in high purity with a minimum of trialkyl phenol impurity. This invention also relates to a process for converting 2-alkyl phenols to 2,6-dialkyl phenols at low temperatures with a minimum of reaction time and with a minimum formation of trialkyl phenols.

In U.S. Patent 2,831,898 a process is disclosed and claimed for selectively introducing hydrocarbon groups onto the nuclear ring of phenol using aluminum phenoxide as a catalyst. While this process can be used to effectively produce 2,6-dialkyl phenols, a large amount of 2,4,6-trialkyl phenols are also produced resulting in an impure dialkylated product. Separation and purification of the 2,6-dialkyl phenol is made more complex by the presence of the 2,4,6-trialkyl phenol. There are also large amounts of 2-alkyl phenols present which also increase the cost of obtaining pure 2,6-dialkyl phenol. 2,6-dialkyl phenols are antioxidants and are used as intermediates in the preparation of other antioxidants. The presence of the 2-alkyl phenol interferes with the effective use of the 2,6-dialkyl phenols in certain applications where they are used as intermediates. Likewise the presence of the 2,4,6-trialkyl phenol is often deleterious. There is, therefore, a need for a method for preparing 2,6-dialkyl phenols which are relatively free from 2-alkyl phenols and 2,4,6-trialkyl phenols.

Further, there is at present no great commercial demand for 2-alkyl phenols. There is thus a need for a method for readily converting these 2-alkyl phenols, at low cost, to 2,6-dialkyl phenols.

It is therefore an object of this invention to provide a method for preparing 2,6-dialkyl phenols directly from 2-alkyl phenols and an olefin at heretofore unusable low temperatures and with a minimum of reaction time. It is a further object of this invention to provide a new-ortho-alkylation catalyst comprising an aluminum (2-alkyl phenoxide) and to prepare 2,6-dialkyl phenols utilizing an aluminum (2-alkylphenoxide) as a catalyst. It is still a further object of this invention to provide an improved process for the preparation of 2,6-dialkyl phenols from phenol and an olefin with a minimum of work-up time and purification procedures. It is an other object of this invention to conduct such preparation of 2,6-dialkyl phenol from phenol utilizing an aluminum (2-alkyl phenoxide).

Applicant's invention results from their discovery that an aluminum (2-alkyl phenoxide) has the unexpected and unobvious property of converting, with an olefin, a 2-alkyl phenol to a 2,6-dialkyl phenol in heretofore unattainable yields, purity and reaction time and at sub-normal ortho-alkylation temperatures. Striking features of this invention are the rapidity with which such conversions take place, the low temperatures at which they occur and the high purity of product. For example, reacting pure 2-tertbutylphenol with isobutylene, and using aluminum tris (2-tert-butyl phenoxide) as a catalyst, 2,6-di-tert-butylphenol was produced in about 5 minutes at 10° C. and with a 94 percent purity.

Accordingly an embodiment of this invention is the provision of an aluminum salt of a mono-ortho-substituted phenol having the formula

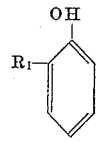

wherein $R_1$ is selected from the group consisting of alkyl of from 2–12 carbon atoms, cycloalkyl of from 6–12 carbon atoms and aralkyl of from 8–12 carbon atoms.

In another embodiment of this invention we provide a process for the preparation of a di-ortho-substituted phenol which comprises reacting a mixture comprising (a) A phenol having the formula:

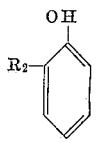

wherein $R_2$ is selected from the group consisting of alkyl of from 2–12 carbon atoms, cycloalkyl of from 6–12 carbon atoms and aralkyl of from 8–12 carbon atoms, (b) An olefin, and
(c) An aluminum salt of a phenol having the formula:

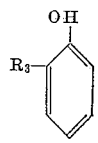

wherein $R_3$ is selected from the group consisting of alkyl of from 2–12 carbon atoms, cycloalkyl of from 6–12 carbon atoms and aralkyl of from 8–12 carbon atoms, said mixture being substantially free of phenol and phenol-generating ethers.

The aluminum (2-alkyl phenoxide) may be referred to, for convenience, as an "ortho catalyst." It is important that the reaction mixture, at the time of reaction with the "ortho catalyst" be substantially free of unreacted phenol and alkyl phenyl ethers. The unreacted phenol will react with the aluminum (2-alkyl phenoxide) to form aluminum phenoxide and 2-alkyl phenol, thereby destroying the "ortho catalyst." The alkyl phenyl ethers, which are intermediate reaction products in phenol orthoalkylations must also be kept at relatively low amounts since they have been found to have a poisoning effect on the "ortho catalyst." In general, only those alkyl phenyl ethers which can generate phenol in the presence of an aluminum phenoxide (alkylated or unalkylated) need be avoided.

In a preferred embodiment of this invention, the olefin corresponds to $R_2$ as this results in a more facile and speedier reaction.

In another preferred embodiment the alkylphenol portion of the "ortho catalyst" is the same as the 2-alkyl-phenol to be alkylated. In such cases the "ortho catalyst" can readily be prepared in situ by adding a reactive aluminum salt to the reaction system containing the 2-alkyl-phenol. Thus, according to these latter embodiments we provide a process for the preparation of a di-ortho-substituted phenol which comprises reacting a mixture of an olefin, a phenol having a substituent in one ortho position corresponding to said olefin and a hydrogen atom in another ortho position and an aluminum phenoxide catalyst, said phenoxide being mono-substituted in the ortho position with a substituent corresponding to said olefin, said mixture being substantially free of phenol and an ether comprised of phenol and a substituent corresponding to said olefin.

Applicants' discovery can also be utilized in the more facile preparation of 2,6-dialkyl phenols in high purity directly from phenol. Broadly stated, this process involves reacting phenol and an olefin under normal orthoalkylation conditions (e.g. with isobutylene, at above 90° C. and under a pressure in excess of 100 p.s.i.g.), using an aluminum phenoxide catalyst (at, e.g. 3 mole percent concentration), cooling the resultant mixture to below that temperature at which trialkylated phenols readily form (e.g., below 90° C.), at such a time when the concentration of 2-alkyl phenol and 2,6-dialkyl phenol approaches a maximum, and thereupon conducting the reaction in the presence of an aluminum (2-alkyl phenoxide) at such lower temperature.

By cooling a normal orthoalkylation reaction mixture at a point when the concentration of 2-alkyl phenol and 2,6-dialkyl phenol is at or near a maximum, the formation of excessive amounts of 2,4,6-trialkyl phenol is effectively halted. Such trialkyl phenols require the higher temperatures used in the normal orthoalkylation reaction for their ready formation. It has been found that the kinetics of the orthoalkylation reaction is such that when the total molar concentration of 2-alkyl phenol and 2,6-dialkylphenol is at or approaches a substantial maximum, (e.g. 75–100 mole percent) only a small amount, i.e. up to about 5 or 6 percent, of 2,4,6-trialkyl phenol has been formed. Also at that point the amount of unreacted phenol and alkyl phenyl ethers have dropped to where they are substantially approaching their minimum values.

Accordingly, we provide a process for the preparation of the di-ortho-substituted phenol wherein a mono-ortho-substituted phenol is formed as an intermediate reaction product, which comprises (a) Reacting phenol, an olefin, and an aluminum phenoxide catalyst until the total concentration of said di-ortho-substituted phenol and said mono-ortho-substituted phenol is at least about 75 mole percent, and (b) Reacting said mono-ortho-substituted phenol with said olefin in the presence of an aluminum salt of a mono-ortho-substituted phenol having the formula

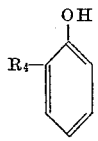

wherein $R_4$ is selected from the group consisting of alkyl of from 2–12 carbon atoms, cycloalkyl of from 6–12 carbon atoms and aralkyl of from 8–12 carbon atoms.

It is preferred that $R_4$ correspond to the olefin; that is that the phenol portion of the "ortho catalyst" be the same as the mono-ortho-substituted phenol being alkylated.

Although the amount of phenol and alkyl phenyl ethers remaining in the reaction mixture at the point of cooling is small, nevertheless they prevent effective use of the aluminum(2-alkyl phenoxide) as a catalyst. To overcome the deleterious effects of these materials, the aluminum(2-alkyl phenoxide) can be added in stoichiometric catalytic-excess of such materials or can be prepared in situ with concurrent complexing of phenol and ethers. This latter procedure can be accomplished very effectively by adding, after cooling, an amount of a reactive aluminum salt that is in stoichiometric catalytic-excess of any alkyl phenyl ethers and unreacted phenol in the mixture. The unreacted phenol will react with the aluminum salt to form aluminum trisphenoxide and the alkyl phenyl ethers will complex with such phenoxides and/or the original aluminum phenoxide or will generate phenol which will react with the aluminum salt forming aluminum phenoxide. The excess of reactive aluminum salt should be a catalytic excess i.e., from 0.001 to 5.0 mole percent, preferably from 0.001 to 1.0 mole percent based on the 2-alkyl phenol. Large amounts even up to 50 mole percent or greater, can of course be used but are not necessary. Of course, the reaction mixture may contain no alkyl phenyl ethers and/or no unreacted phenols, in which case the term stoichiometric catalytic-excess would mean only a catalytic amount. By conducting the process as outlined above, 2,6-dialkyl phenols can be prepared more quickly, inexpensively and in purer form than heretofore realizable.

As noted, when the total molar amounts of 2-alkylphenol and 2,6-dialkylphenol are at maximum levels their total concentration ranges from 75–100 mole percent. These alkyl phenols need not necessarily be at a maximum. However, since large amounts of ether and phenol will otherwise be present, the use of excessive and inordinate amounts of reactive aluminum salt can be avoided by approaching the maximum concentration of alkyl phenols. When the alkyl phenols are 2-tert-butylphenol and 2,6-di-tert-butyl phenol it is preferred that the reaction in the presence of the "ortho catalyst" be commenced when their total concentration is from 85–100 mole percent and more preferably, at least 90 mole percent.

Accordingly, we provide a process for the preparation of a di-ortho-substituted phenol wherein a mono-ortho-substituted phenol is formed as an intermediate reaction product, which comprises, (a) Reacting phenol, an olefin, and an aluminum phenoxide catalyst until the total concentration of said di-ortho-substituted phenol and said mono-ortho-substituted phenol is at least about 75 mole percent, (b) Adding a reactive aluminum salt to the resultant mixture that is in stoichiometric catalytic-excess of any phenol-generating ether and unreacted phenol in said mixture and, thereupon, (c) Reacting said mono-ortho-substituted phenol with said olefin.

Preparation of the "ortho catalyst" in situ can be accomplished using aluminum salts that will react with or complex with phenol and/or alkyl phenyl ethers. It is only important that the stoichiometric excess will also react with the 2-alkyl phenol to form an "ortho catalyst" or else be an "ortho catalyst" itself. Thus an aluminum (2-alkyl phenoxide) itself can be used. Aluminum alkyl compounds such as tri-methyl aluminum, triethyl aluminum, tri-n-propyl aluminum and triisobutyl aluminum can be used. Also such compounds as diethyl aluminum malonate, diethyl aluminum hydride and triphenyl aluminum can be used.

Mixtures of the above aluminum compounds can also be used, including such commercial mixtures as triethyl aluminum-diethyl aluminum hydride mixtures and triethyl-trimethyl aluminum mixtures. The preferred compound is triethyl aluminum because of its high reactivity and ready availability at low cost.

The aluminum compounds can be added directly to the reaction system or may be added along with an inert solvent such as hexane, benzene or toluene.

When reacting a mono-ortho-alkyl phenol with an olefin, using an "ortho catalyst," the reaction will proceed readily at well below room temperature. Higher temperatures can also be used, but in many cases are unnecessary. If the temperature used is above that required for the formation of trialkyl phenols (e.g. with 2-tert-butyl phenol and isobutylene, above 90° C.), then there will be a higher amount of such impurity in the product. Generally reaction temperatures of from about −10 to about 100° C. are convenient with a temperature range of from 0–90° C. preferred.

The term "alkyl" as used above is meant to include not only alicyclic alkyl, but also cycloalkyl and aralkyl.

In general alkyl groups of from 2-12 carbon atoms, cycloalkyl groups of from 6-12 carbon atoms and aralkyl groups of from 8-12 carbon atoms are preferred. Of the alicyclic alkyl groups, those having at least 4 carbon atoms are particularly preferred as they result in higher yields with less reaction time.

The term "olefin" is meant to include monolefinic alicyclic alkenes of from 2-12 carbon atoms, cycloalkenes of from 6-12 carbon atoms and aralkenes of from 8-12 carbon atoms.

The number of phenyl groups associated with aluminum in both the aluminum phenoxide catalyst (not ortho substituted) and the "ortho catalyst" is generally three under anhydrous conditions. However, the term "aluminum phenoxide" or "ortho catalyst" is meant to include those aluminum compounds wherein one of the phenyl groups (substituted or not) is replaced by an hydroxyl group or by a halogen such as chlorine. If water is present, as when using commercial phenol, an hydroxyl group may displace one of the phenyl groups on either catalyst. Thus the aluminum phenoxide may be aluminum trisphenoxide or monohydroxy aluminum diphenoxide or mixtures thereof. Likewise the "ortho catalyst" may be an aluminum tris(2-alkylphenoxide) or a monohydroxy aluminum di(2-alkylphenoxide) or mixtures thereof. The prevalence of a particular composition will depend on the amount of water in the system, temperature and concentrations involved. In the reaction system, the aluminum phenoxide or "ortho catalyst" may also complex with additional phenol, substituted or otherwise or with ethers. The amount and nature of such complexing will depend on the particular stage of the reaction. When the "ortho catalyst" is formed in situ, one or more of the 2-alkyl phenol groups may be replaced by phenol, the extent of such replacement depending on reaction conditions and relative concentration of components. The relative effectiveness of the "ortho catalyst" will generally be reduced by displacement with phenol.

In all of the above embodiments, it is preferred that the olefins and alkyl groups have at least 4 carbon atoms as the process is thereby accomplished more readily. It is particularly preferred that isobutylene be used and that the mono-ortho-substituted phenol be 2-tert-butylphenol. Results achieved with these materials are best.

When these latter embodiments are followed, it is found that the formation of 2,4,6-tri-tert-butylphenol is kept at a minimum by reacting 2-tert-butylphenol with isobutylene in the presence of the "ortho catalyst" at a temperature below about 90° C. and preferably below about 60° C. Although previous orthoalkylation procedures fail at such temperatures, the processes of this invention operate very satisfactorily. Thus in the most preferred embodiment of invention we provide a process for the preparation of 2,6-di-tert-butylphenol wherein tert-butyl phenyl ether and 2-tert-butylphenol are formed as intermediate reaction products, which comprises (a) Heating phenol, isobutylene and an aluminum phenoxide catalyst at a temperature of at least 90° C. and under a pressure in excess of 100 p.s.i.g. until the total molar concentration of said 2,6-di-tert-butylphenol and said 2-tert-butylphenol is substantially a maximum, (b) Cooling the resultant mixture to below about 90° C., (c) Adding a reactive aluminum salt in an amount that is in stoichiometric catalytic-excess of any tert-butyl phenyl ether and unreacted phenol in said mixture and thereupon (d) Reacting said 2-tert-butylphenol with said isobutylene at a temperature below about 90° C.

The following examples in which all parts are by weight will illustrate the embodiments of this invention.

EXAMPLE 1

This example illustrates the preparation of an "ortho catalyst" from the reaction of a 2-alkylphenol with an aluminum alkyl.

To a reaction vessel equipped with a stirrer, heating and cooling means, temperature measuring means and reagent adding means, a solution of 45 parts of 2-tert-butylphenol in 150 parts of n-hexane is added and stirred at 30° C. A solution of 2.7 parts of triethyl aluminum in 2.5 parts of n-hexane are added dropwise over a 20-minute period, the temperature being maintained between 20° C. and 30° C. by cooling. Hydrogen evolution occurs and after cessation the mixture is stirred for one hour at room temperature and cooled to 5° C. A precipitate forms which is filtered, washed with n-hexane and air dried to yield solid aluminum tris(2-tert-butyl phenoxide) which when analyzed is found to correspond closely to the theoretical.

In like manner, other "ortho catalysts" can be prepared. Thus an aluminum (2-isopropylphenoxide) can be prepared from the reaction of 2-isopropylphenol and diethyl methyl aluminum. Likewise 2-n-octylphenol can be reacted with diethyl aluminum hydride to yield an aluminum (2 - n-octylphenoxide). Similarly 2-(4-dodecyl) phenol can be reacted with trimethyl aluminum to yield aluminum tris[2-(4'-dodecyl)phenoxide]. Also aluminum tris[2-(2'-decyl)phenoxide] can be prepared from the reaction of 2-(2'-decyl) phenol with a triethyl-triisobutyl aluminum mixture. Further 2-tert-amylphenol can be reacted with triethylaluminum to yield aluminum tris-(2-tert-amylphenoxide). Other "ortho catalysts" that can be similarly prepared include aluminum tris (2-sec-butyl-phenoxide) from the reaction of 2-sec-butylphenol and triethyl aluminum; an aluminum(2-ethylphenoxide) from the reaction of 2-ethylphenol with aluminum tris(thiophenoxide); aluminum tris(2-benzylphenoxide) from the reaction of 2-benzylphenol and triethyl aluminum; aluminum tris[2-(3'-nonyl)phenoxide] from the reaction of a triethyl-tri-methyl aluminum mixture with 2-(3'-nonyl)-phenol; aluminum tris[2-(3' - undecyl)phenoxide] from the reaction of tri-n-propyl aluminum and 2-(3'-undecyl)-phenol; an aluminum(2-n-hexylphenoxide) from the reaction of 2-n-hexylphenol and a triethyl aluminum-diethyl aluminum hydride mixture; aluminum tris[2-(p-n-butyl-cyclohexyl)phenoxide] from the reaction of tri-n-propyl aluminum, and 2-(p-n-butyl-cyclohexyl)phenol; and aluminum tris[2-(2'-heptyl)phenoxide] from the reaction of triisobutyl aluminum and 2-(2'-heptyl)phenol.

EXAMPLE 2

*Preparation of "ortho catalyst."*—To a reaction vessel equipped with a stirrer, heating and cooling means, temperature measuring means and reagent adding means, 397 parts of 2-tertbutylphenol were added and stirred at 30° C. A solution of 7 parts of triethyl aluminum in 61 parts of toluene was added dropwise over a 20-minute period, the temperature being maintained between 21° C. and 30° C. by cooling. The color of the mixture changed to a pale yellowish green. The mixture was stirred for one hour at room temperature resulting in the preparation of aluminum tris(2-tert-butyl-phenoxide) admixed with 2-tert-butylphenol.

*Alkylation.*—The above mixture was charged to a pressure vessel equipped with heating and cooling means, stirrer, temperature measuring means, gas inlet and outlet tubes and pressure measuring means and an additional 53 parts of 2-tert-butylphenol were added. The vessel was sealed and pressurized to 45 p.s.i.g. with 112 parts of isobutylene whereupon the temperature rose from 26° C. to 52° C. in four minutes. Sample No. 1 was removed at this time and an additional 224 parts of isobutylene were added with cooling over the next six minutes, with the temperature varying from 31-36° C. Sample No. 2 was then removed. The isobutylene pressure during the above reaction ranged from 25 to 55 p.s.i.g.

Sample Nos. 1 and 2 were analyzed by vapor phase chromatography and the results are listed:

| Sample No. | Total Reaction Time (minutes) | Weight Percent | |
|---|---|---|---|
| | | 2-tert-butylphenol | 2,6-di-tert-butyl-phenol |
| 1 | 4 | 33.6 | 56.5 |
| 2 | 10 | 3.2 | 85.0 |

EXAMPLE 3

*Preparation of "ortho catalyst."*—To the reaction vessel of Example 2, 442 parts of 2-tert-butylphenol were added and stirred at 30° C. A solution of 3.33 parts of triethylaluminum in 43 parts of toluene was added dropwise over a 20-minute period forming aluminum tris(2-tert-butylphenoxide) admixed with 2-tert-butylphenol.

*Alkylation.*—The above mixture was charged to the pressure vessel of Example 2. The vessel, at 10° C., was sealed and pressurized to 45 p.s.i.g. with 336 parts of isobutylene over a period of one minute and the temperature rose to 17° C. Three samples were removed at periods thereafter of 30 seconds, 2 minutes and 4½ minutes, at the end of which time the temperature had risen to 39° C. The samples were analyzed by vapor phase chromatography and the results are listed.

| Sample No. | Total Reaction Time (minutes) | Weight Percent | |
|---|---|---|---|
| | | 2-tert-butylphenol | 2,6-di-tert-butyl-phenol |
| 1 | 1½ | 14.8 | 79.2 |
| 2 | 3 | 9.1 | 85.8 |
| 3 | 5½ | 1.1 | 93.5 |

In like manner other mono-ortho alkyl phenols can be further alkylated at low temperatures and good yields with an olefin and an "ortho catalyst." Thus the addition of 0.001 mole percent trimethyl aluminum to 2-(2'-hexyl)phenol that is substantially free of phenol and phenyl ethers, results in a mixture of 2-(2'-hexyl)phenol and aluminum tris[2-(2'-hexyl)phenoxide]. The addition of hexene-1 results in the rapid formation of 2,6-di-(2'-hexyl)phenol at room temperature. If octene-3 is used instead of hexene-1, the resulting product will be 2-(2'-hexyl)-6-(4'-octyl) phenol. Likewise, the reaction of 2-tert-amyl phenol with nonene-4 at 150° C. in the presence of aluminum tris (2-sec-butyl phenoxide) results in the preparation of 2-tert-amyl-6-(5'-nonyl)phenol. Similarly, the addition of 5.0 mole percent diethyl aluminum malonate to 2-ethylphenol followed by reaction with butene-1 at −10° C. results in the preparation of 2-sec-butyl-6-ethyl phenol. Similarly, the addition of 2.0 mole percent triethyl aluminum to 2-(dipropylcyclohexyl)phenol followed by reaction with dipropylcyclohexene at 70° C. yields 2,6-di-(dipropylcyclohexyl)phenol. Also, the addition of 1.0 mole percent triphenyl aluminum to 2-(2'-hexyl)phenol followed by reaction with hexene-1 at 90° C. yields 2,6-di-(2'-hexyl)phenol. Also, 3.5 mole percent of aluminum thiophenoxide can be added to 2-(α-n-butyl-α-methylbenzyl) phenol at 45° C. to yield 2,6-di-(α-n-butyl-α'-methylbenzyl) phenol. Further the reaction of 2-(3'-undecyl)phenol with isobutylene at 0° C. in the presence of an aluminum tris (2-tert-butyl phenoxide) results in the preparation of 2-tert-butyl-6-(3'-undecyl)phenol.

EXAMPLE 4

In this example, a "normal" orthoalkylation run is conducted, reacting phenol and isobutylene with an aluminum phenoxide catalyst, until the total concentration of 2-tert-butylphenol and 2,6-di-tert-butylphenol approaches substantially a maximum. Thereafter, the reaction is coiled and alkylation is continued, at low temperatures, with an aluminum (2-tert-butylphenoxide) catalyst prepared in situ.

*Preparation of aluminum phenoxide catalyst.*—To a reaction vessel equipped with heating and cooling means, stirrer, temperature measuring means, gas inlet and outlet tubes, reagent adding means and pressure measuring means were added 408 parts of distilled phenol and 3.6 parts of aluminum metal. The vessel was sealed and the mixture was heated to 125° C., the pressure rising from 0 to 70 p.s.i.g. The pressure rise was accompanied by an exothermic reaction which increased the autoclave temperature to 150° C., evidencing the preparation of aluminum trisphenoxide. The mixture was cooled to 65° C. and the remaining pressure (60 p.s.i.g. of hydrogen) was vented.

*"Normal" orthoalkylation.*—The vessel was again sealed and 560 parts of isobutylene were added over a period of 4 minutes and 20 seconds. The mixture was heated to 135–140° C. and at a pressure of 325–355 p.s.i.g. while an additional 168 parts of isobutylene were added over a period of 46 minutes. The vessel was then cooled to 12° C. and a sample was taken which was analyzed by vapor phase chromatography. It contained 43.6 mole percent of 2-tert-butyl-phenol, 48.3 mole percent of 2,6-di-tert-butyl phenol, 1.7 mole percent of tert-butyl phenyl ether, 2.5 mole percent of unreacted phenol and 1.7 mole percent of 2,4,6-tri-tert-butyl phenol.

*Continuation with "ortho-catalyst".*—The above mixture was cooled to 7° C. 25.0 parts of triethylaluminum in 86.7 parts of toluene were added while the temperature ranged from 7° C. to 11° C. The reaction was completed with the temperature held between 6° C. and 11° C. A sample was taken which was analyzed by vapor phase chromatography. It contained 19.8 mole percent of 2-tert-butyl phenol, 69.4 mole percent of 2,6-di-tert-butyl phenol and 3.4 mole percent of 2,4,6-tri-tert-butyl phenol.

In the above manner, appreciable conversions of 2-tert-butyl phenol to 2,6-di-tert-butyl phenol are accomplished and with only inconsequential amounts of 2,4,6-tri-tert-butylphenol being obtained. Conversions of this nature, at the temperatures described, have heretofore been unattainable.

In like manner other phenols can be ortho alkylated until substantial mono-ortho- and di-ortho-substituted phenols have formed whereup alkylation is continued using an "ortho catalyst." Thus phenol can be alkylated at 160° C. with heptene-1, using aluminum phenoxide as a catalyst. The reaction is continued until the total concentration of 2-(2'-heptyl)phenol and 2,6-di-(2'-hepyl) phenol is 75 mole percent whereupon the mixture is cooled to 60° C. The mixture is found to contain small amounts of unreacted phenol. A stoichiometric catalytic-excess of tri-n-propyl aluminum is added and the reaction is continued at 60° C. resulting in the preparation of 2,6-di(2'-heptyl)phenol in high yield with only small amounts of 2,4,6-tri-(2'-heptyl)phenol and 2-(2'-heptyl) phenol present.

Likewise phenol can be alkylated at 150° C. with cyclohexene using aluminum trisphenoxide as a catalyst. The reaction is continued until the total concentration of 2,6-di-cyclohexyl phenol and 2-cyclohexyl phenol is 90 mole percent, whereupon 5.5 mole percent of triisobutyl-aluminum is added. A rapid conversion of the 2-cyclohexyl phenol to 2,6-di-cyclohexyl phenol takes place.

Also, asymmetric amylene can be reacted with phenol at 120° C. using an aluminum phenoxide catalyst. As the reaction proceeds, samples are taken and analyzed to determine the time at which 2-tert-amyl phenol and 2,6-di-tert-amyl phenol are formed in maximum molar amount. The reaction is repeated anew until that time is reached, whereupon the mixture is cooled to 10° C. and a stoichiometric catalytic-excess of triisobutyl aluminum is added. The reaction proceeds to yield substantially pure 2,6-di-tert-amyl phenol.

Similarly, dodecene-1 can be reacted with phenol at 170° C. using an aluminum phenoxide catalyst. After 45 minutes it is cooled to 90° C. and 25 weight percent of triethyl aluminum is added. The reaction proceeds to yield high amounts of 2,6-di-(2'-dodecyl)phenol.

Further phenol can be reacted with styrene at 160° C. and using aluminum trisphenoxide as a catalyst. When the concentration of 2-(α-methylbenzyl)phenol and 2,6-di(α-methylbenzyl) phenol is 85 mole percent, the mixture is cooled to —10° C. and 16 mole percent of aluminum tris[2-(α-methylbenzyl)phenoxide] is added. The reaction proceeds to yield high amounts of 2,6-di-(α-methyl-benzyl) phenol relatively free of 2-(α-methylbenzyl) phenol and 2,4,6-tri-(α-methylbenzyl)phenol.

EXAMPLE 5

To illustrate the effect of excess alkyl phenyl ether on the above reactions, 2-tert-butyl phenol was reacted with isobutylene in the presence of tert butyl phenyl ether, using aluminum tris(2-tert-butyl phenoxide) as a catalyst.

The "ortho catalyst" was prepared, as in Examples 2 and 3, by reacting 450 parts of 2-tert-butyl phenol with 4.20 parts of triethylaluminum in 26 parts of toluene at 25° C. The resultant mixture was charged to the pressure vessel of Example 2 and 50 parts of tert-butyl phenyl ether were added. The vessel was sealed and the solution was stirred for 40 minutes. Isobutylene was added, while cooling, until 336 parts of isobutylene were added in 7 minutes over a temperature range of from 6–7° C. The mixture was stirred for an additional 20 minutes and the temperature was raised to 35° C. with stirring for another 25 minutes whereupon a sample was removed. It was analyzed by vapor phase chromatography and contained 91.0 mole percent 2-tert-butyl phenol, 6.4 mole percent tert-butyl phenyl ether and 2.6 mole percent 2,6-di-tert-butyl phenol, demonstrating that no appreciable conversion took place.

EXAMPLE 6

To illustrate the effect of excess phenol on the above reactions, 2-tert-butyl phenol was reacted with isobutylene in the presence of phenol, using aluminum tris(2-tert-butyl phenoxide) as a catalyst.

The ortho catalyst was prepared as in Examples 2 and 3 by reacting 450 parts of 2-tert-butyl phenol with 5.7 parts of triethylaluminum in 22 parts of toluene at 22–28° C. in the reaction vessel of Example 2. The mixture was stirred until gas evolution stopped, about 20 minutes, and 14.1 parts of phenol were added. The resultant mixture was charged to the pressure vessel of Example 2 and the vessel was sealed. 336 parts of isobutylene were added in 2 minutes at 13.5–14° C. The mixture was stirred for one hour and 31 minutes at 12–43° C. whereupon a sample was removed. It was analyzed by vapor phase chromatography and contained 92.0 mole percent 2-tert-butyl phenol, 0.6 mole percent tert-butyl phenyl ether and 5.2 mole percent 2,6-di-tert-butyl-phenol, demonstrating that no appreciable conversion took place.

EXAMPLE 7

This example illustrates that normal orthoalkylation catalysts are not effective in converting 2-tert-butyl phenol to 2,6-di-tert-butyl phenol at low temperatures.

To the pressure vessel of Example 2 were added 450 parts of 2-tert-butyl phenol and 15.3 parts of aluminum trisphenoxide. The vessel was sealed and 336 parts of isobutylene were added in six minutes at 14–16° C. The mixture was stirred for one hour and 41 minutes at 12–59° C. whereupon a sample was removed. It was analyzed by vapor phase chromatography and contained 93.8 mole percent 2-tert-butyl phenol, 0.2 mole percent tert-butyl phenyl ether and 3.7 mole percent 2,6-di-tert-butyl phenyl ether, demonstrating that no appreciable conversion took place.

We claim:
1. A process for the preparation of a di-ortho-substituted phenol which comprises reacting a mixture consisting essentially of
   (a) a phenol having the formula:

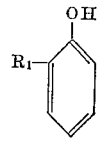

wherein $R_1$ is selected from the group consisting of alkyl of from 2–12 carbon atoms, cycloalkyl of from 6–12 carbon atoms and aralkyl of from 8–12 carbon atoms,
   (b) an olefin, and
   (c) an aluminum salt of a phenol having the formula:

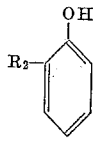

wherein $R_2$ is selected from the group consisting of alkyl of from 2–12 carbon atoms, cycloalkyl of from 6–12 carbon atoms and aralkyl of from 8–12 carbon atoms,
said mixture being substantially free of phenol and phenol-generating ethers.

2. The process of claim 1 wherein said olefin corresponds to $R_1$.

3. The process of claim 2 wherein $R_1$ and $R_2$ have at least 4 carbon atoms.

4. A process for the preparation of a di-ortho-substituted-phenol which comprises reacting a mixture of an olefin, a phenol having a substituent in one ortho position corresponding to said olefin and a hydrogen atom in another ortho position and an aluminum phenoxide catalyst, said phenoxide being mono-substituted in the ortho position with a substituent corresponding to said olefin, said mixture being substantially free of phenol and an ether comprised of phenol and a substituent corresponding to said olefin.

5. A process for the preparation of 2,6-di-tert-butyl-phenol which comprises reacting a mixture of isobutylene, 2-tert-butyl phenol and an aluminum (2-tert-butyl phenoxide), said mixture being free of phenol and tert-butyl ether.

6. A process for the preparation of a di-ortho-substituted phenol wherein a mono-ortho-substituted phenol is formed as an intermediate reaction product, which comprises
   (a) reacting a mixture consisting essentially of phenol, an olefin and an aluminum phenoxide catalyst at a temperature above 90° C. until the total concentration of said di-ortho-substituted phenol and said mono-ortho-substituted-phenol is at least about 75 mole percent, and
   (b) reacting said mono-ortho-substituted-phenol at a temperature below about 90° C. with said olefin in the presence of an aluminum salt of a mono-ortho-substituted phenol having the formula

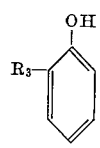

wherein $R_3$ is selected from the group consisting of alkyl of from 2–12 carbon atoms, cycloalkyl of from 6–12 carbon atoms of aralkyl of from 8–12 carbon atoms.

7. A process for the preparation of a di-ortho-substituted phenol wherein a mono-ortho-substituted phenol is formed as an intermediate reaction product, which comprises
- (a) reacting a mixture consisting essentially of phenol, an olefin, and an aluminum phenoxide catalyst at a temperature above about 90° C. until the total concentration of said di-ortho-substituted phenol and said mono-ortho-substituted-phenol is at least about 75 mole percent, and
- (b) reacting said mono-ortho-substituted phenol at a temperature below about 90° C. with said olefin in the presence of an aluminum salt of said mono-ortho-substituted phenol.

8. The process of claim 7 wherein said olefin contains at least 4 carbon atoms.

9. A process for the preparation of 2,6-di-tert-butylphenol wherein 2-tert-butylphenol is formed as an intermediate reaction product, which comprises
- (a) reacting phenol, isobutylene and an aluminum phenoxide catalyst at a temperature above about 90° C. until the total concentration of said 2,6-di-tert-butylphenol and said 2-tert-butylphenol is at least about 85 mole percent, and
- (b) reacting said 2-tert-butylphenol and said isobutylene at a temperature below about 90° C. in the presence of an aluminum (2-tert-butylphenoxide).

10. A process for the preparation of 2,6-di-tert-butylphenol wherein 2-tert-butylphenol is formed as an intermediate reaction product, which comprises
- (a) heating phenol, isobutylene and an aluminum phenoxide catalyst at a temperature of at least 90° C. and under a pressure in excess of 100 p.s.i.g. until the total molar concentration of said 2,6-di-tert-butyl phenol and 2-tert-butlyphenol is substantially a maximum,
- (b) cooling the resultant mixture to below about 90° C.
- (c) reacting said 2-tert-butylphenol and said isobutylene at a temperature below about 90° C. in the presence of an aluminum (2-tert-butylphenoxide).

11. A process for the preparation of a di-ortho-substituted phenol wherein a phenol-generating ether and a mono-ortho-substituted phenol are formed as intermediate reaction products, which comprises
- (a) reacting phenol, an olefin and an aluminum phenoxide catalyst at a temperature above about 90° C. until the total concentration of said di-ortho-substituted phenol and said mono-ortho-substituted phenol is at least about 75 mole percent,
- (b) adding a reactive aluminum salt to the resultant mixture in an amount that is in stoichiometric catalytic-excess of any phenol-generating ether and unreacted phenol in said mixture and, thereupon,
- (c) reacting said mono-ortho-substituted phenol with said olefin.

12. The process of claim 11 wherein said olefin contains at least 4 carbon atoms.

13. The process of claim 12 wherein said reactive aluminum salt is an aluminum alkyl.

14. A process for the preparation of 2,6-di-tert-butylphenol wherein tert-butyl-phenyl ether and 2-tert-butyl-phenol are formed as intermediate reaction products, which comprises
- (a) reacting phenol, isobutylene and an aluminum phenoxide catalyst at a temperature above about 90° C. until the total molar concentration of said 2,6-di-tert-butylphenol and said 2-tert-butylphenol in the resultant mixture is at least 85 mole percent,
- (b) adding a reactive aluminum salt to the resultant mixture in an amount that is in stoichiometric catalytic-excess of any tert-butyl phenyl ether and unreacted phenol in said mixture and, thereupon,
- (c) reacting said 2-tert-butylphenol with said isobutylene.

15. The process of claim 14 wherein said reactive aluminum salt is an aluminum alkyl.

16. A process for the preparation of 2,6-di-tert-butyl phenol wherein tert-butyl phenyl ether and 2-tert-butyl-phenol are formed as intermediate reaction products, which comprises
- (a) heating phenol, isobutylene and an aluminum phenoxide catalyst at a temperature of at least 90° C. and under a pressure in excess of 100 p.s.i.g. until the total molar concentration of said 2,6-di-tert-butylphenol and said 2-tert-butylphenol is substantially a maximum,
- (b) cooling the resultant mixture to below about 90° C.,
- (c) adding triethyl aluminum in an amount that is in stoichiometric catalytic-excess of any tert-butyl phenyl ether and unreacted phenol in said mixture and, thereupon,
- (d) reacting said 2-tert-butylphenol with said isobutylene at a temperature below about 90° C.

References Cited
UNITED STATES PATENTS

| | | | |
|---|---|---|---|
| 1,689,356 | 10/1928 | Meerwein | 206—448 |
| 2,292,205 | 8/1942 | Denison et al. | 206—448 |
| 2,831,898 | 4/1958 | Ecke | 260—624 |
| 3,032,595 | 5/1962 | Neuworth | 260—624 |
| 3,051,762 | 8/1962 | Stroh et al. | 260—624 |
| 3,133,974 | 5/1964 | Curry et al. | 260—624 |

LEON ZITVER, *Primary Examiner.*

TOBIAS E. LEVOW, DANIEL D. HORWITZ,
*Examiners.*

W. B. LONE, *Assistant Examiner.*

UNITED STATES PATENT OFFICE
CERTIFICATE OF CORRECTION

Patent No. 3,355,504                                       November 28, 1967

Thomas H. Coffield et al.

It is hereby certified that error appears in the above numbered patent requiring correction and that the said Letters Patent should read as corrected below.

Column 10, line 48, before "ether" insert -- phenyl --; line 55, before "90° C." insert -- about --.

Signed and sealed this 11th day of February 1969.

(SEAL)
Attest:

Edward M. Fletcher, Jr.                                  EDWARD J. BRENNER
Attesting Officer                                               Commissioner of Patents